May 22, 1951      A. F. SHIELDS      2,554,065

PNEUMATICALLY ACTUATED BRAKE SLACK ADJUSTER

Filed Nov. 1, 1947      2 Sheets—Sheet 1

INVENTOR.
ALBERT F. SHIELDS
BY
Warren S. Orton.
ATTORNEY

INVENTOR.
ALBERT F. SHIELDS
BY
Warren S. Orton.
ATTORNEY

Patented May 22, 1951

2,554,065

UNITED STATES PATENT OFFICE 2,554,065

PNEUMATICALLY ACTUATED BRAKE SLACK ADJUSTER

Albert F. Shields, Forest Hills, N. Y., assignor to Sier-Bath Gear & Pump Co., Inc., North Bergen, N. J., a corporation of New Jersey Application November 1, 1947, Serial No. 783,585

8 Claims. (Cl. 188—79.5)

The invention relates in general to an automatic slack adjuster for fluid pressure brakes and particularly relates to adjusting mechanism for use on automatic vehicle brakes in which slack in the brake operating mechanism is automatically adjusted in response to the usual brake mechanism when the control therefore moves beyond its predetermined range of normal operation.

The present disclosure constitutes another embodiment of the invention disclosed in my co-pending application Serial No. 760,416, filed July 11, 1947.

As recited in the prior application it has been known in this art to incorporate a slack adjuster or wear compensating mechanism in and as part of the usual brake-applying mechanism so that an over-travel of such mechanism in its normal operation will re-adjust the brake applying mechanism in such way as will compensate automatically for wear in the operative elements of the brake applying mechanism.

These known devices have not proven entirely satisfactory in actual service particularly when installed on automotive vehicles, among other reasons mainly because they were unsafe. The parts thereof which form the wear compensating means is an integral part of the brake applying mechanism and thus a failure in their automatic slack adjuster feature would mean a complete brake failure. Further in these known devices the automatic adjuster elements are quite apt to function accidentally due to their interlocking features; to make, or at least attempt to make, an adjustment when not needed; elements were often used which could not withstand the vibration and rough usage to which normal operation would subject them, and in general such devices are so complicated in structure and operation as to render their use too expensive and in many cases not entirely suited for their intended purpose.

This invention as well as the invention disclosed in the prior application is to provide a simple form of slack adjuster which is supplemental to and thus can be regarded as an addition to or an attachment to any usual form of brake actuating mechanism otherwise complete per se, and which attachment can be added as a separate unit to known form of wheel-brake actuating mechanism. In general the disclosure features brake wearing compensating mechanism which will normally be inactive and thus removed from any possibility of partaking in the usual braking operation and which will come into operation only when the power generating element of the conventional brake applying mechanism moves over an excessive range of travel in its effect to cause the desired clutching action of the brakes.

In the prior application the re-setting of the cam relative to the brake shoes controlled thereby was by mechanical means while in this application device the same objectives are attained by pneumatically powered means, valvular controlled by any excessive travel of the pneumatically actuated brake applying mechanism.

Various other objects and advantages of the invention will be in part obvious from a consideration of the method features of the disclosure and from an inspection of the accompanying drawing and in part will be more fully set forth in the following particular description of one method of practicing the invention, and the invention also consists in certain new and novel modifications of the preferred method and of other features of construction and combination of parts, hereinafter set forth and claimed.

Figure 1:
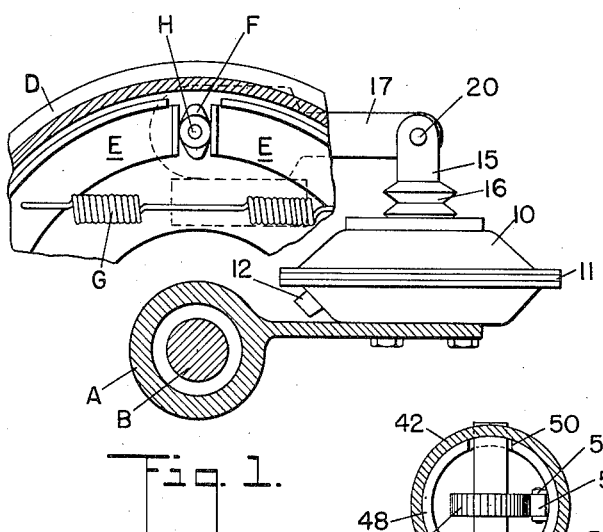
Fig. 1 is a view partly in vertical transverse section of a wheel-brake drum, associated shoes and their operating cam, and partly in elevation showing an attachment thereto constituting a preferred embodiment of the invention and the parts in section taken on the broken line 1—1 of Fig. 2.
Figure 6:
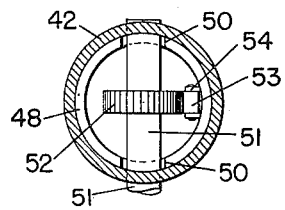
Fig. 6 is a detailed transverse sectional view taken on the line 6—6 of Fig. 5 looking upwardly as indicated by the arrows.
Figure 2:
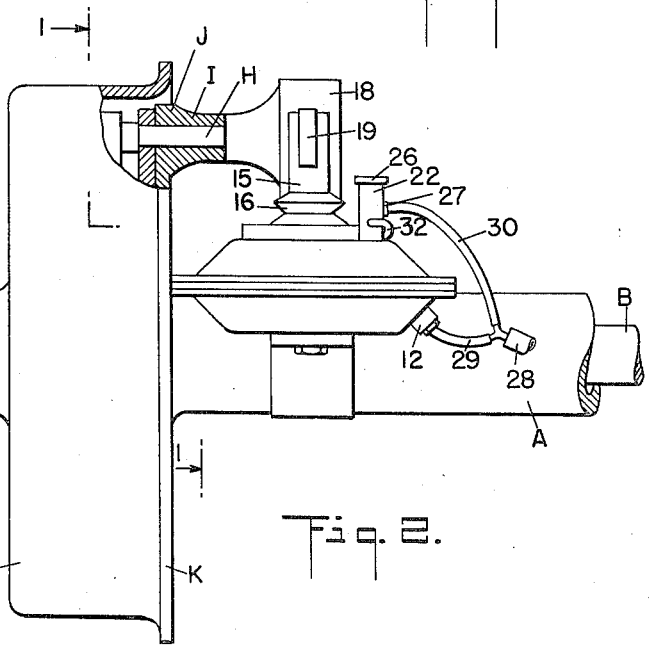
Fig. 2 is an enlarged view mainly in side elevation of the device shown in Fig. 1.

In the drawings and referring first to conventional vehicle wheel-brake parts there is illustrated in Figs. 1 and 2 an axle housing A containing a wheel driving axle B for turning wheel C and associated brake drum D. Mounted within the drum is a pair of distensible brake shoes E with an actuating double lobe cam F operating between their free ends and which free ends are held in engagement with the opposite long sides of the cam by a spring G. The cam is actuated by a cam shaft H mounted in bearing I in the form of a boss J projecting from a rear face plate K carried by the axle housing A and closing the rear side of the drum D all as is used with a known type of vehicle wheel-brake.

Referring first to the mechanism which operates the cam F to distend the shoes E and thus cause the brake to function, there is disclosed a source of pneumatic power and in this particular case the device as a whole is shown to be of the compressed air actuated wheel-brake type. The power for operating the brake is supplied to a two-part pressure containing casing 10 secured to the axle housing and between which two parts is clamped a freely swinging diaphragm 11. Compressed air is admitted conventionally to one side of the diaphragm through a tapped inlet 12.

A long main cam operating plunger 13 is slidably mounted in suitable bearing provided therefore in the casing 10 for reciprocating movement and at its inner end the plunger has a broad disk-like head 14 secured to and movable with the central portion of the diaphragm. In normal operation the diaphragm has a relatively short amplitude of swing at its center, say of sufficient extent to move the head 14 from the solid line position to the dotted line position of Fig. 4.

Figure 4:
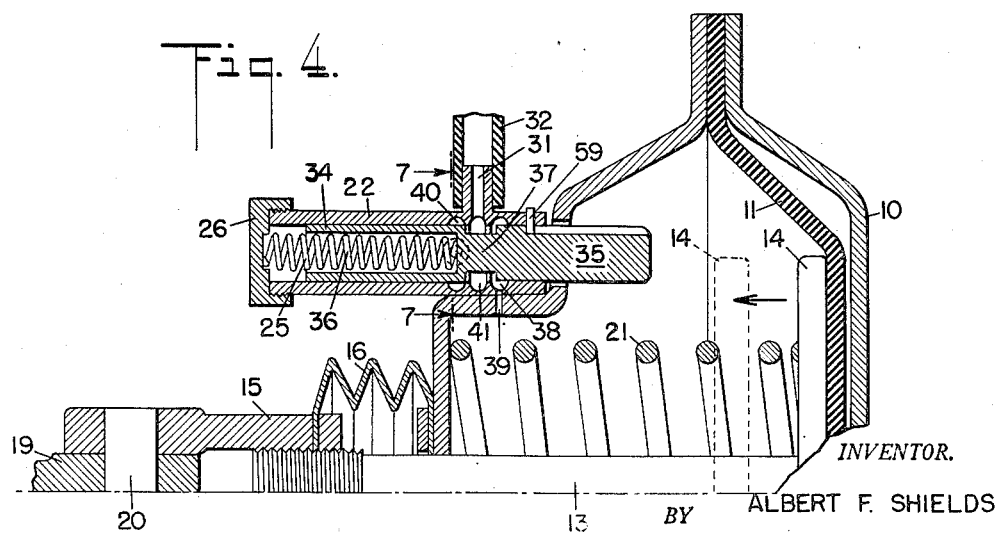
Fig. 4 is a longitudinal sectional view taken on the horizontal plane indicated by the line 4—4 of Fig. 3 with the movable parts of both Figs. 3 and 4, shown in their normal inoperative, non-braking position.

The plunger 13 extends through the side of the casing 10 nearest the cam shaft and has this end threaded in the portion thereof which extends exteriorly of the casing. A clevis forming fork 15 is in adjustable threaded engagement with the projecting portion of the plunger as best shown in Fig. 4. An accordion 16 fitted to the casing and plunger defeats entrance of water or dirt to the interior of the casing through the opening in which the plunger slides. An operating arm 17 is provided with an enlarged head 18 considered for the moment as secured to the cam shaft H to rock the same. A reduced end 19 of the arm has its free end fitted between the bifurcations of the fork 15 and is pivoted thereto by pivot pin 20. Up to this point the disclosure corresponds exactly to the similar parts in my above-identified application.

Figure 3:
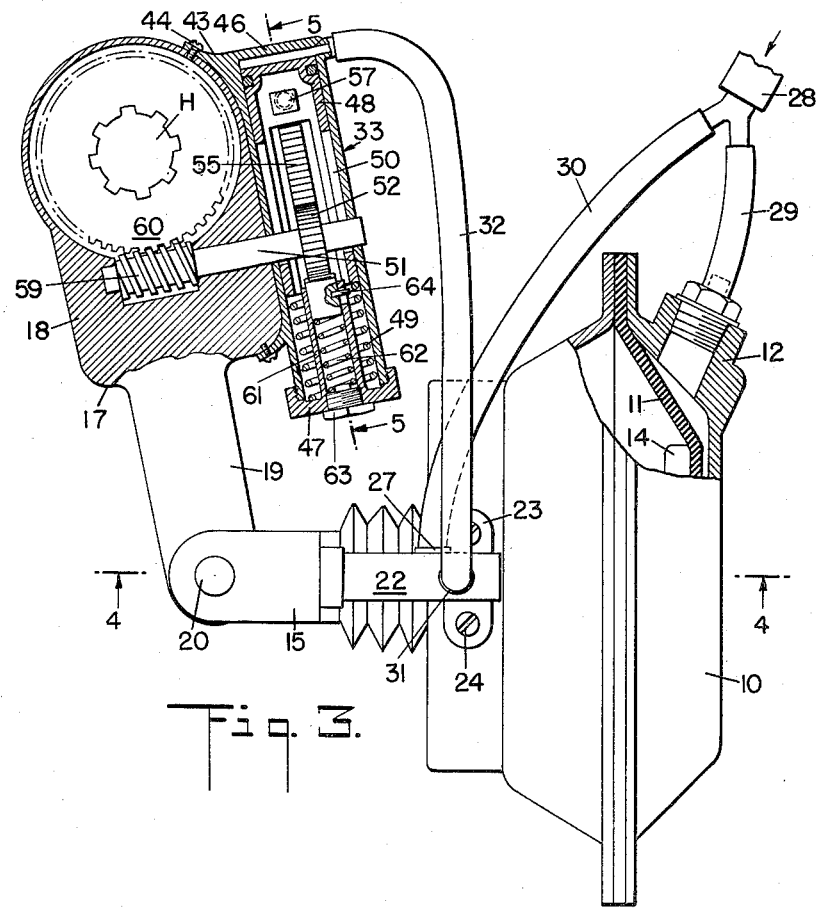
Fig. 3 is an enlarged view, partly in side elevation and with parts broken away and partly in section of the brake actuating device shown in the preceding figures.

For the purpose of indexing the cam adjusting mechanism herein featured there is disclosed at the casing 10 a valvular casing 22 of cylindrical form having its inner end fitted to the casing 10 and secured thereto through outstanding flanges 23 and screws 24 as best shown in Fig. 3.

Figure 7:
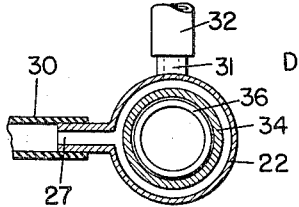
Fig. 7 is a detailed section taken on the line 7—7 of Fig. 4.

The cylinder casing 22 is provided with a bore 25, see Fig. 4, extending entirely therethrough and closed at its outer end by a screw cap 26. The casing 22 is provided adjacent its inner end with a pressure intake port defined by an outstanding nipple 27 shown in full lines in Figs. 2, 3 and 7 and in dotted lines in Fig. 4.

Air pressure for operating both the cam F in the normal operation of the brake and for operating the adjusting mechanism herein featured is supplied from an external source indicated symbolically by the Y-coupling 28. One flexible tube 29 leads from the Y-coupling to the inlet 12 and another flexible tube 30 leads from the Y-coupling to the pressure intake nipple 27 of the casing 22.

The cylinder casing 22 is also provided with a pressure outlet port defined by a nipple 31 (see Figs. 4 and 7) to which is secured one end of a flexible tube 32, the other end of which leads to apparatus generally designated as a cam adjuster 33 which is secured to the head 18 as hereinafter described. Communication between the port defining nipples 27 and 31 is controlled by a plunger-type of valve 34 slidably mounted for axial movement in the bore 25 of the casing 22. The valve 34 is provided at one end with a plunger 35 guided in the inner end of the bore 25, projects therefrom into the casing 10 and is disposed in the path of movement of the plunger head 14 as it moves on its brake applying stroke. The plunger is normally spaced from and is thus completely independent of the normal amplitude of swing of the head 14, except in those cases where an excessive movement of the head 14 causes it to bear on and thus shift the plunger as a whole to the left of the showing in Fig. 4. The valve plunger 34—35 is backed by a strong return spring 36 housed in the recessed barrel forming the outer end of the valve and bears at one end on the valve and at its other end on the cap 26 in a tendency to close the inlet supplied from the pressure source through tube 30. A pin and slot form of stop 59 limits the advance of the plunger valve 34 under pressure from the spring 36.

In the region of the nipples 27—31 the valve 34 is reduced to form a waist-like portion defining an annular passageway 37. The portion of the wall of the bore 25 in which the passageway reciprocates is recessed to provide three parallel channels facing the passageway 37. The innermost channel 38 is normally open to the interior of the casing 10 through a bleeder vent 39. The outermost channel 40 is open to the port formed by the nipple 27 and thus to the source of pneumatic power supplied through the coupling 28. The middle channel 41 is open to the port defined by the nipple 31 and thus to the adjuster 33 as shown in Figs. 3 and 4 to actuate the same.

The shoulders on the unreduced portion of the valve 34 defining opposite ends of the annular passageway 37 are so related that normally, that is when the valve is in the position shown in Fig. 4, the left pressure intake channel 40 is closed, and both the bleeder vent 39 and nipple 31 leading to the cam adjuster 33 is open, but of course inactive.

When the valve 34 is shifted to the left of the showing in Fig. 4 as hereinafter described, the solid plunger end 35 of the valve 34 will be in position to close the bleeder vent 39, and the shoulder which defines the barrel portion of the valve in which the spring 36 is contained will uncover passageway 40 and thus open the supply of air pressure from the tube 30 through the nipple 27, passageway 37, channel 41 and nipple 31 to the tube 32 to actuate the cam adjuster 33.

Figure 5:
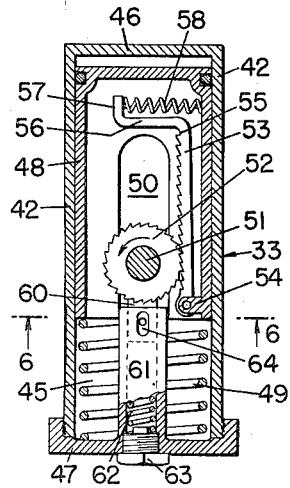
Fig. 5 is an axial sectional view of the cam adjuster taken on the line 5—5 of Fig. 3 and separated from its mounting.

Referring to the cam adjuster 33 reference is made particularly to Figs. 3 and 5 where it is seen that pressure from the tube 32 is caused to operate through a metering device to make a rotative adjustment of the cam shaft H. The metering device includes a cylinder 42 fitted to the head 18 and including flanges 43 fitted to, and secured to the side of the head by screws 44 as shown in Fig. 3. The cylinder is provided with a bore 45 closed at one end by a head 46 and at its other end by a screw cap 47. A hollow piston 48 reciprocates in the bore 45 and is biased when free of any pressure thereon to move upwardly by spring 49 located between the same and the cap 47.

Opposite sides of the piston are provided with parallel slots 50 and therethrough extends one end of a worm shaft 51 journalled in the head 18 as shown in Fig. 3. A one-way ratchet wheel 52 is secured to the shaft within the outlines of the piston.

A long pawl 53 of L-shaped form has one end pivoted to a bracket 54 integral with the lower open end of the piston as shown in Fig. 5. A long leg of the pawl extends lengthwise along the inner side of the hollow piston and is provided with a line of rack forming teeth 55 which engage with the teeth of the ratchet wheel 52 to rotate the ratchet wheel, and with it the shaft 51, in a counter-clockwise direction each time the piston 48 is elevated towards the position shown in Fig. 5 from any position below that illustrated to which it may have been forced by pressure from the tube 32.

The upper leg 56 of the pawl extends radially inwardly from the rack, in all positions thereof overlaps the ratchet wheel 52 and is provided with an upturned end forming a spring abutment or spring stop 57. A long pawl actuating spring 58 reacts between this stop and a side of the piston in a tendency to keep the pawl-rack and ratchet wheel teeth at all times interengaged as shown in Fig. 5.

The shaft 51 is provided with a worm 59 which meshes with a large worm gear 60 splined to the cam shaft H as shown in Fig. 3. In this way any excessive travel of the diaphragm head 14 beyond that necessary to cause the normal application of the brake will cause the indexing mechanism to reset the cam F in such a way as will cause it to take up any slack which may develop between the cam F, the shoes E and the brake drum D. The device is complete as therefore described. It has been found, however, that when installed on trucks, unsprung vehicles subjected to high vibration that there is often a tendency for the pawl teeth 55 to escape from their engagement with the teeth of ratchet wheel 52. With ratchet wheel 52 thus free to turn even momentarily there is the possibility of an accidental rotation of the shaft 51 and thus a re-setting of the cam F relative to the brake shoes E. In order to prevent any such possibility it is herein suggested that detent means be provided to lock the ratchet wheel 52 at all times against any unintended rotation. For this purpose a toothed detent 60 is slidably mounted on and projects from a barrel 61 formed integral with the cap 47 and centered within the spring 49 in the cylinder 42. The detent 60 is mounted with its toothed advance end in engagement with the teeth of a ratchet wheel 52 and is under load from a spring 62 housed within barrel 61, bearing at one end on the detent and at its other end against a stop nut 63 screwed into the cap 47 at its center. A pin and slot stop 64 limits the permissible movement of the detent.

In operation and assuming the several parts to be in their normal inoperative position shown in the several figures, actuating air pressure admitted conventionally to the right side of the diaphragm 11 when in the position shown in Fig. 4 will swing the center of the diaphragm and with it the plunger head 14 from right to left as indicated by the arrow in Fig. 4 a distance, say that measured between the full line and dotted line position of the plunger head. This action will cause the plunger 13 to act through fork 15 and arm 17 to shift the arm in a clockwise direction from its normal position shown in Fig. 3 for a distance sufficient to act through the cam shaft H, and shift the cam F from the position shown in Fig. 1 or adjusted variation therefrom into such angled position as will move the brake shoes E outwardly into a braking engagement with the brake drum as is usual in such cases. Releasing air pressure as by releasing the foot pedal which controls the brakes will permit or cause the brake actuating mechanism to return to its normal, inoperative position by means forming no part of this disclosure of the brake actuating mechanism. The powerful return spring 21 is shown in Fig. 4 biased to return all parts to their normal inoperative position.

Now let it be assumed that in operating the mechanism to cause the brake to function the head 14 engages the exposed adjacent end of the plunger 35 to shift the valve 34 against the resistance of its return spring 36 a distance to cause the plunger 35 first to close the bleeder vent 39 and then to open communication between the source of pneumatic pressure admitted from pressure tube 30 to channel 40 and through passageway 37, nipple 31 and tube 32 to the top of bore of cylinder 42. The pressure thus admitted to the top of the cylinder as shown in Figs. 3 and 5 will depress piston 48 against the resistance of its return spring 49 thus placing spring 49 more fully under tension than it is normally. As the piston is thus lowered more or less, the teeth of the pawl 53 is slid idly past the teeth of the ratchet wheel 52 with some incidental compression of the pawl controlling spring 58. The piston 48 is thus cocked ready to be elevated from such depressed position when freed of the depressing pneumatic power which forced it downwardly in the cylinder 42. Spring 58 being at all times under load acts to maintain the teeth 55 in a one-way lifting engagement with the teeth of ratchet wheel 52.

Relieving the mechanical pressure on the plunger 35 by the retreat of the head 14 will permit spring 36 to restore the valve 34 to its normal position as shown in Fig. 4. This opens the cylinder 42 to relieve the pressure therein back through tube 32, nipple 31, channel 41, passageway 37 and channel 38 to the bleeder vent 39 discharging into the casing 10. The piston 48 being thus relieved of its air pressure will permit spring 49 to react and elevate the piston back towards its normal position shown in Fig. 3. As the piston is thus elevated the teeth of pawl 53 re-engages the teeth of ratchet wheel 52 and rotates the same in a counter-clockwise direction as indicated by the arrow in Fig. 5 to rotate shaft 51 and therethrough to cause worm 59 and worm gear 60 to turn more or less and thus cause a rotative adjustment of shaft H and that of the cam F controlled thereby to take up any slack between the cam F and the adjacent ends of the brake shoes E.

It is thus possible to operate both the brake applying mechanism as well as the brake adjusting mechanism automatically from a single source of pneumatic power in turn controlled solely by the usual foot pedal commonly employed to actuate the brakes. The brake adjusting features are normally inactive and thus need use none of the pneumatic power until required to make the necessary resetting of the brake applying cam and then the necessary power is applied automatically and without attention on the part of the operator. When no longer needed

I claim:

1. In a device of the class described, the combination with a shaft, a source of pneumatic power, a pressure chamber open to said source and provided with a swinging diaphragm having a normal amplitude of swing, a chain of mechanically connected parts between the diaphragm and the shaft to turn the shaft at each such normal amplitude of swing of the diaphragm, of pneumatically actuated mechanism independent of said chain of connected parts and controlled by an abnormally excessive amplitude of swing of the diaphragm for indexing the shaft, said mechanism including a valvular control having a plunger spring biased towards the diaphragm, disposed in the path of swing of the diaphragm, normally disposed in an inoperative position, spaced from the limit of normal amplitude of swing and engaged by and shifted by the diaphragm against the resistance of the spring when the diaphragm swings beyond said limit of normal amplitude of swing, and said pneumatically actuated mechanism comprising a chain of connected parts including indexing mechanism for moving the shaft over an arc of turn controlled by the extent to which the plunger is shifted beyond said limit of normal swing, said indexing mechanism including a ratchet wheel secured to the cam shaft, a pneumatically actuated piston, a pawl carried by the piston for feeding the ratchet wheel and thus the cam shaft in one direction and said valvular control operatively controlled by the spring biased plunger to open the source of pneumatic pressure to the piston to move the same and thus actuate the ratchet wheel each time the diaphragm swings beyond said limit of normal amplitude of swing.

2. In a device of the class described, the combination of a shaft, an arm mounted to swing on the shaft and operatively connected as it swings to rotate the shaft, a worm gear drive carried by the arm to adjust the shaft rotatively relative to the arm, a source of power including a reciprocating member, a first chain of connected parts at all times connecting said reciprocating member with the arm to operate the same and a second chain of connected parts separate from and thus independent of said first chain and normally inoperative, said second chain including a pneumatic pressure system comprising a ratchet mechanism, a pressure conduit leading from a source of pneumatic pressure to said mechanism, and a spring loaded valve for controlling the same, said valve being normally closed and operatively connected to be opened to supply pressure from the source directly to said mechanism upon an excessive extent of travel of the reciprocating member and said valve normally operative to open the conduit to the outside of the device to bleed the ratchet mechanism, and said ratchet mechanism connected to the worm gear drive to cause it to adjust the shaft relative to the swinging arm on any such excessive travel of the reciprocating power member.

3. In a device of the class described, the combination with a mechanical element, a swinging diaphragm, a chain of mechanically connected parts between the diaphragm and element for causing the same to function when the diaphragm is actuated, and pedal controlled pneumatic means for actuating the diaphragm of mechanism for adjusting element incidental to an over travel of the diaphragm, said mechanism including a pneumatically actuated source of mechanical power and a chain of mechanically connected parts between said source and the element, a valve for controlling the supply of pneumatic pressure to said pneumatically actuated source of mechanical pressure, said valve being normally closed to intercept the flow of pneumatic pressure past the same and including a control disposed in the path of movement of the diaphragm when swinging beyond the point necessary to cause the first mentioned chain of parts to function thus to cause the last named chain or mechanically connected parts to function by reason of such over travel of the diaphragm and otherwise independent of the diaphragm.

4. In a brake slack adjuster, the combination of brake mechanism and a slack adjuster including a pneumatically actuated ratchet device operatively disposed to take up slack in said mechanism, a casing provided therein with a swinging diaphragm for operating the mechanism, a source of fluid pressure open to one side of the diaphragm to move the same on its operating stroke, a pneumatic conduit independent of any pressure in the casing and directly connecting the source with the ratchet device, a valve for controlling the conduit, said valve including a plunger disposed in the path of movement of the diaphragm and operatively associated with the same to cause the valve to open the conduit and thus place the ratchet device in communication with the source of fluid pressure upon excessive travel of the diaphragm, and a spring acting on the plunger for biasing said valve towards a normal closed position and opposing displacement thereof by the diaphragm.

5. In a device of the class described, the combination of a support, a worm shaft journaled in the support, an attachment to the support for locking the shaft against accidental rotation and for rotating the shaft by pneumatic power, said attachment including a pressure cylinder, a piston of cylindrical form slidably guided longitudinally in the cylinder and having its side provided with at least one longitudinally extending slot, an end of said shaft extending through the cylinder and through said slot and operative to prevent the piston from rotating, a ratchet wheel secured to the part of the shaft within the piston, a spring-loaded toothed detent at one end of the cylinder engaging the ratchet wheel and biased to resist its rotary movement and thus acting to lock the shaft against accidental rotation, a pawl housed within and extending lengthwise of the piston and provided with a line of saw teeth engaging the ratchet wheel to rotate the same on the working stroke of the piston, said pawl pivoted at one end to the piston and a spring engaging the other end of the pawl to maintain its teeth in engagement with the ratchet wheel in all positions of the piston, means for supplying pneumatic power to the cylinder to move the piston idly in one direction, and a spring acting on the piston to move it in its opposite direction on its working stroke.

6. In combination with a brake applying mechanism complete per se and comprising a chain of connected parts and a main motor including a diaphragm casing having therein a swinging diaphragm acting on the chain normally to operate said mechanism, of an attachment for readjusting the relation of certain parts of the chain to take up slack therein, said attachment including metering means acting on one of said parts and including a pneumatically actuated adjuster motor and a conduit for leading pneumatic pressure from a source of supply to the adjuster motor, valvular means included in the conduit for regulating the pressure flow therethrough, said valvular means including a valve casing carried by the diaphragm casing, a valve slidably mounted in the valve casing, a valve spring acting normally on the valve to intercept flow from the source to the adjuster motor and to bleed the adjuster motor to the outside air, a plunger secured to the valve and having an end in the path of movement of the diaphragm, spaced from the diaphragm during its normal amplitude of swing and said diaphragm on an abnormal swing operating on the plunger to cause it to move the valve against the resistance of the valve spring into position to place the same in fluid connection with the adjuster motor to cause it to function.

7. In combination with a brake system complete per se and including a mechanical brake, a pneumatic power device including a swinging diaphragm and a chain of connected parts between the diaphragm and the brake to function normally on a powered swing of the diaphragm in one direction, said diaphragm being limited in its amplitude of swing on its powered stroke by the movement of the brake into its final braking position, and which chain of parts is liable to develop a slack therein during use thus permitting an additional extent of amplitude of swing of the diaphragm on its working stroke before the brake functions, of an attachment to the system including normally inoperative pneumatically energized readjustment mechanism connected to the parts of the chain to take up the slack therein, said mechanism including a valvular control therefor disposed in the path of an abnormal swing of the diaphragm, a spring acting thereon and biased to move the control in the direction towards the diaphragm, a stop for limiting the movement of the valvular control towards the diaphragm, said valvular control when in engagement with said stop being spaced thereby beyond the normal amplitude of swing of the diaphragm and disposed to be engaged by the diaphragm and moved thereby against the resistance of its loading spring when the diaphragm develops an abnormal amplitude of swing to cause the valvular control to affect the readjustment mechanism to function automatically as an incident of such an over-travel of the diaphragm.

8. The combination of a brake assembly including a mechanical brake, a pneumatically energized power unit formed of a main casing, a diaphragm dividing the casing into two separate parts, one part forming a pressure chamber and the other part a mechanism containing chamber, and a chain of connected parts including a plunger guided in the main casing and actuated by the diaphragm, said chain connecting the diaphragm with the brake and operative to cause the brake to function when pressure is admitted to the pressure chamber, said diaphragm having normally a relatively small amplitude of swing to actuate the brake when the chain is substantially free of slack and having a greater amplitude of swing when there is slack in the chain, pneumatically powered mechanism operating on the chain to take up automatically any slack therein, and a control for regulating the transmission of pneumatic power therethrough to said mechanism, said control including a control casing carried by the main casing as an attachment thereto, a spring-loaded plunger guided in the control casing and having its advance end located in the mechanism controlling chamber in position normally spaced from the diaphragm when on its normal and relatively small amplitude of swing and in position to be moved by the diaphragm when on its greater amplitude of swing, thereby to cause the pneumatically actuated mechanism to function.

ALBERT F. SHIELDS.

REFERENCES CITED

The following references are of record in the file of this patent:

UNITED STATES PATENTS

| Number | Name | Date |
|---|---|---|
| 1,284,614 | Desmond | Nov. 12, 1918 |
| 1,604,267 | Down | Oct. 26, 1926 |
| 1,673,078 | Kempton et al. | June 12, 1928 |
| 1,689,235 | Fowler et al. | Oct. 30, 1928 |
| 2,084,662 | Williamson | June 22, 1937 |
| 2,097,533 | Redford | Nov. 2, 1937 |
| 2,156,154 | Hooker | Apr. 25, 1939 |
| 2,246,201 | Farmer | June 17, 1941 |
| 2,379,796 | Freeman et al. | July 3, 1945 |

FOREIGN PATENTS

| Number | Country | Date |
|---|---|---|
| 650,826 | Germany | of 1936 |